United States Patent
Kim et al.

(10) Patent No.: US 10,577,441 B2
(45) Date of Patent: Mar. 3, 2020

(54) METHOD OF PREPARING VINYL CHLORIDE-BASED POLYMER AND APPARATUS FOR PREPARING VINYL CHLORIDE-BASED POLYMER

(71) Applicant: LG CHEM, LTD., Seoul (KR)

(72) Inventors: Kun Ji Kim, Daejeon (KR); Seong Yong Ahn, Daejeon (KR); Se Woong Lee, Daejeon (KR); Hyun Kyou Ha, Daejeon (KR)

(73) Assignee: LG CHEM, LTD., Seoul (KR)

( * ) Notice: Subject to any disclaimer, the term of this patent is extended or adjusted under 35 U.S.C. 154(b) by 154 days.

(21) Appl. No.: 15/775,200

(22) PCT Filed: Aug. 28, 2017

(86) PCT No.: PCT/KR2017/009384
§ 371 (c)(1),
(2) Date: May 10, 2018

(87) PCT Pub. No.: WO2018/044017
PCT Pub. Date: Mar. 8, 2018

(65) Prior Publication Data
US 2018/0355079 A1    Dec. 13, 2018

(30) Foreign Application Priority Data
Sep. 2, 2016 (KR) .......................... 10-2016-0113346

(51) Int. Cl.
| | |
|---|---|
| *C08F 14/06* | (2006.01) |
| *B01J 19/02* | (2006.01) |
| *B01J 19/06* | (2006.01) |
| *B01J 19/18* | (2006.01) |
| *C08F 2/01* | (2006.01) |

(Continued)

(52) U.S. Cl.
CPC ............. *C08F 14/06* (2013.01); *B01J 19/002* (2013.01); *B01J 19/06* (2013.01); *B01J 19/18* (2013.01);
(Continued)

(58) Field of Classification Search
CPC .... C08F 14/06; C08F 2/01; C08F 2/18; C08F 2/44; B01J 19/02; B01J 19/06;
(Continued)

(56) References Cited

U.S. PATENT DOCUMENTS

| | | |
|---|---|---|
| 4,771,114 A | 9/1988 | Kobayashi et al. |
| 2001/0004666 A1 | 6/2001 | Makino et al. |

(Continued)

FOREIGN PATENT DOCUMENTS

| | | |
|---|---|---|
| EP | 1502925 A1 | 2/2005 |
| JP | 2009-062425 A | 3/2009 |

(Continued)

*Primary Examiner* — William K Cheung
(74) *Attorney, Agent, or Firm* — Dentons US LLP

(57) ABSTRACT

The present invention relates to a method of preparing a vinyl chloride-based polymer, which may prepare a vinyl chloride-based polymer with excellent surface properties by adjusting a foam level generated during a polymerization reaction to an appropriate value, a vinyl chloride-based polymer prepared thereby, and an apparatus for preparing a vinyl chloride-based polymer which may prepare the vinyl chloride-based polymer. The method of preparing a vinyl chloride-based polymer according to the present invention may prepare a vinyl chloride-based polymer with excellent surface properties, for example, fewer occurrences of fisheyes and excellent transparency, by performing a polymerization reaction while maintaining the level of a foam generated during the polymerization reaction at an appropriate value.

7 Claims, 1 Drawing Sheet

(51) Int. Cl.
  *C08F 2/18* (2006.01)
  *C08F 2/44* (2006.01)
  *C08L 27/06* (2006.01)
  *B01J 19/00* (2006.01)

(52) U.S. Cl.
  CPC .................. *C08F 2/01* (2013.01); *C08F 2/18* (2013.01); *C08F 2/44* (2013.01); *C08L 27/06* (2013.01); *B01J 2219/0025* (2013.01); *B01J 2219/00182* (2013.01)

(58) Field of Classification Search
  CPC ............. B01J 19/18; B01J 2219/00182; B01J 2219/0025; C08L 27/06
  USPC .......................................................... 526/59
  See application file for complete search history.

(56) References Cited

U.S. PATENT DOCUMENTS

| | | | |
|---|---|---|---|
| 2005/0027088 A1* | 2/2005 | Nakahara | C08F 14/06 526/344 |
| 2013/0059959 A1 | 3/2013 | Kim et al. | |
| 2014/0024755 A1 | 1/2014 | Kim et al. | |

FOREIGN PATENT DOCUMENTS

| | | |
|---|---|---|
| KR | 10-1993-0010462 B1 | 10/1993 |
| KR | 10-2001-0078170 B1 | 8/2001 |
| KR | 10-2013-0025515 A | 3/2013 |
| KR | 10-2013-0027418 A | 3/2013 |
| KR | 10-2015-0038946 A | 4/2015 |

* cited by examiner

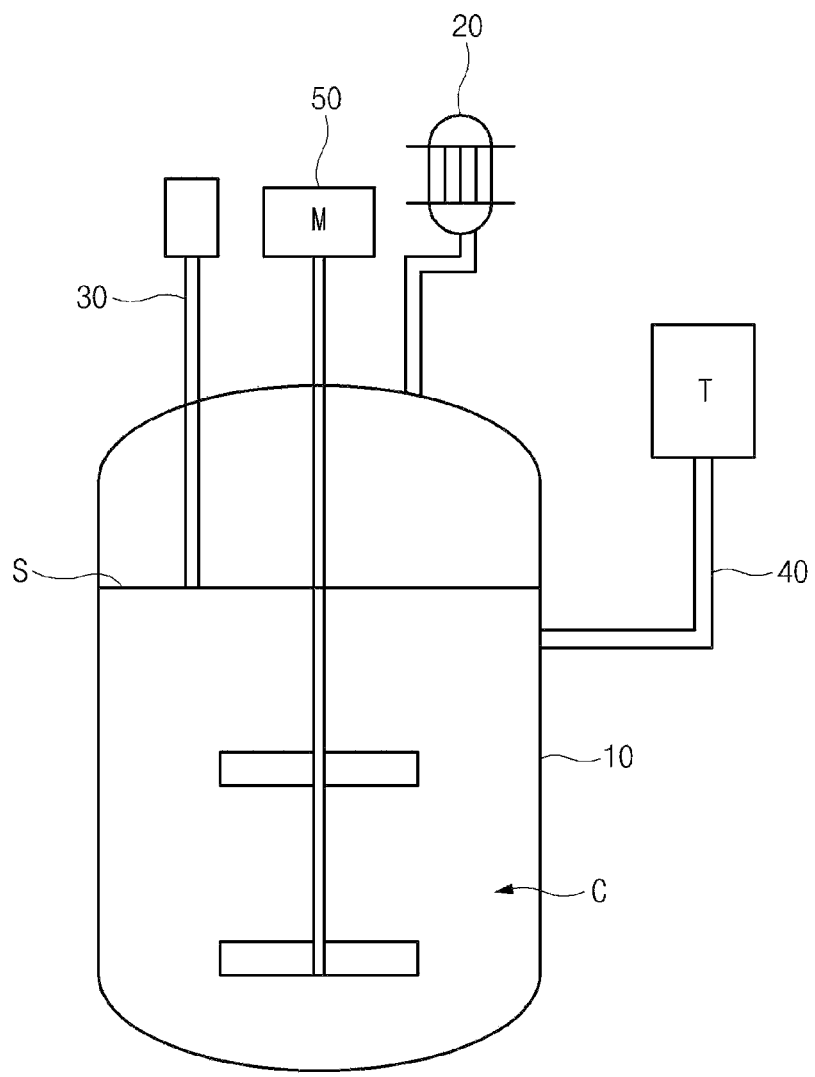

METHOD OF PREPARING VINYL CHLORIDE-BASED POLYMER AND APPARATUS FOR PREPARING VINYL CHLORIDE-BASED POLYMER

TECHNICAL FIELD

This application is a National Stage Entry of International Application No. PCT/KR2017/009384 filed on Aug. 28, 2017, and claims the benefit of Korean Application No. 10-2016-0113346, filed on Sep. 2, 2016, all of which are hereby incorporated by reference in their entirety for all purposes as if fully set forth herein.

TECHNICAL FIELD

The present invention relates to a method of preparing a vinyl chloride-based polymer, which may prepare a vinyl chloride-based polymer with excellent surface properties by adjusting a foam level generated during a polymerization reaction to an appropriate value, a vinyl chloride-based polymer prepared thereby, and an apparatus for preparing a vinyl chloride-based polymer which may prepare the vinyl chloride-based polymer.

BACKGROUND ART

A vinyl chloride-based polymer is a polymer containing 50% or more of vinyl chloride, wherein it has various applications because it is inexpensive, its hardness is easily controlled, and it is applicable to most processing equipments. In addition, since the vinyl chloride-based polymer may provide a molded article having excellent physical and chemical properties such as mechanical strength, weather resistance, and chemical resistance, the vinyl chloride-based polymer is being widely used in many fields.

The vinyl chloride-based polymer has been prepared by various polymerization methods, and has been mainly prepared by suspension polymerization and emulsion polymerization. The suspension polymerization is a method of preparing a vinyl chloride-based polymer having a particle diameter of 150 µm or less by using water, a vinyl chloride-based monomer, a suspension stabilizer, and a polymerization initiator.

Polymerization for preparing the vinyl chloride-based polymer is an exothermic reaction, wherein, in order to control heat generated during the reaction, heating and cooling jackets are installed to the outside of a polymerization reactor to maintain a constant temperature. However, since there is a limit in controlling the heat generated during the reaction only by the jackets as the polymerization reactor becomes larger to improve productivity, a reflux condenser is installed on an upper portion of the polymerization reactor to removal the heat.

However, since the heat control through the reflux condenser is accompanied by evaporation of a reactant, a foam is inevitably generated by the evaporation. The foam becomes a cause of scale formation, wherein polymer particles incorporated into the foam enter the reflux condenser to not only cause the formation of a scale in the reflux condenser and a reduction in heat removal ability, but to also generate fish-eyes to deteriorate surface properties.

In order to address such limitations, Korean Patent Application Laid-open Publication No. 2013-0025515 discloses a method of preparing a vinyl chloride-based polymer which adjusts a temperature of an upper portion of a reflux condenser included in an overhead of a polymerization reactor to a polymerization temperature of the polymerization reactor and simultaneously adjusts a foam level height in the polymerization reactor to satisfy 70% or less through a non-condensable gas exhaust process. However, in this case, when an excessive amount of the non-condensable gas is exhausted, the foam flows backward to the reflux condenser to form a scale, and, as a result, fish-eyes may occur.

Thus, in order to prepare a vinyl chloride-based polymer with excellent surface properties, there is a need to develop a method of adjusting a foam generated during polymerization to an appropriate level.

DISCLOSURE OF THE INVENTION

Technical Problem

The present invention provides a method of preparing a vinyl chloride-based polymer which may prepare a vinyl chloride-based polymer with excellent surface properties by adjusting a foam level generated during a polymerization reaction to an appropriate value.

The present invention also provides a vinyl chloride-based polymer with excellent surface properties prepared by the above-described method.

The present invention also provides an apparatus for preparing a vinyl chloride-based polymer which may prepare the above-described vinyl chloride-based polymer.

Technical Solution

According to an aspect of the present invention, there is provided a method of preparing a vinyl chloride-based polymer which includes introducing a reactant including a polymerization initiator, a suspension stabilizer, and a vinyl chloride-based monomer into a polymerization reactor equipped with a reflux condenser on a top thereof and performing suspension polymerization, wherein the suspension polymerization is performed by adjusting a foam level in the polymerization reactor to be maintained at 10% or less, the foam level represents a ratio of a thickness of a foam generated on an outermost surface of the reactant to a total height from the outermost surface of the reactant in the polymerization reactor to the top of the polymerization reactor, and the foam level is adjusted by adding a defoamer.

According to another aspect of the present invention, there is provided a vinyl chloride-based polymer prepared by the above-described preparation method.

According to another aspect of the present invention, there is provided an apparatus for preparing a vinyl chloride-based polymer which includes a polymerization reactor; a reflux condenser provided on a top of the polymerization reactor; a foam detector separately provided on the top of the polymerization reactor by being separated from the reflux condenser; and a defoamer feed line disposed at a midpoint of the polymerization reactor in a height direction.

Advantageous Effects

A method of preparing a vinyl chloride-based polymer according to the present invention may prepare a vinyl chloride-based polymer with excellent surface properties, for example, fewer occurrences of fish-eyes and excellent transparency, by performing a polymerization reaction while maintaining a level of a foam generated during the polymerization reaction at an appropriate value.

Since a vinyl chloride-based polymer according to the present invention is prepared by the above-described preparation method, the vinyl chloride-based polymer may have excellent surface properties, for example, fewer occurrences of fish-eyes and excellent transparency and haze.

Thus, the method of preparing a vinyl chloride-based polymer according to the present invention and the vinyl chloride-based polymer prepared thereby may be suitable for industries that need a vinyl chloride-based polymer.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

The figure schematically illustrates an apparatus for preparing a vinyl chloride-based polymer according to an embodiment of the present invention.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method of preparing a vinyl chloride-based polymer which may prepare a vinyl chloride-based polymer with excellent surface properties, for example, fewer occurrences of fish-eyes and excellent transparency, by performing a polymerization reaction while maintaining a level of a foam generated during the polymerization reaction in suspension polymerization using a reflux condenser at an appropriate value.

The method of preparing a vinyl chloride-based polymer according to an embodiment of the present invention includes a step (step A) of introducing a reactant including a polymerization initiator, a suspension stabilizer, and a vinyl chloride-based monomer into a polymerization reactor equipped with a reflux condenser on a top thereof and performing suspension polymerization, wherein the suspension polymerization is performed by adjusting a foam level in the polymerization reactor to be maintained at 10% or less, the foam level represents a ratio of a thickness of a foam generated on an outermost surface of the reactant to a total height from the outermost surface of the reactant in the polymerization reactor to the top of the polymerization reactor, and the foam level is adjusted by adding a defoamer.

Specifically, the step A is a step of preparing a vinyl chloride-based polymer by polymerization of a vinyl chloride-based monomer, wherein the step A may be performed by introducing a reactant including a polymerization initiator, a suspension stabilizer, and a vinyl chloride-based monomer to a polymerization reactor equipped with a reflux condenser on the top thereof and performing suspension polymerization.

In an embodiment of the present invention, the vinyl chloride-based monomer may denote a pure vinyl chloride monomer or may denote a mixture of a vinyl chloride monomer and a vinyl-based monomer copolymerizable therewith. That is, the vinyl chloride-based polymer according to the embodiment of the present invention may include a copolymer of a vinyl chloride monomer and a vinyl-based monomer copolymerizable therewith, in which the vinyl chloride monomer is a main component, as well as a polymer composed of a vinyl chloride monomer. In a case in which the vinyl chloride-based monomer is the mixture of the vinyl chloride monomer and the vinyl-based monomer copolymerizable therewith, the mixture may be appropriately adjusted to a weight ratio such that vinyl chloride is included in an amount of 50% or more in the vinyl chloride-based polymer prepared from the mixture.

The vinyl-based monomer copolymerizable with the vinyl chloride monomer is not particularly limited, but, for example, may be an olefin compound such as ethylene, propylene, and butane; vinyl esters such as vinyl acetate, vinyl propionate, and vinyl stearate; unsaturated nitriles such as acrylonitrile; vinyl alkyl ethers such as vinyl methyl ether, vinyl ethyl ether, vinyl octyl ether, and vinyl lauryl ether; halogenated vinylidenes such as vinylidene chloride; unsaturated fatty acids and anhydrides of these fatty acids such as acrylic acid, methacrylic acid, itaconic acid, maleic acid, fumaric acid, maleic anhydride, and itaconic anhydride; unsaturated fatty acid esters such as methyl acrylate, ethyl acrylate, monomethyl maleate, dimethyl maleate, and butyl benzyl maleate; and a crosslinkable monomer such as diallyl phthalate, and the vinyl-based monomer may be used alone or in a mixture of two or more thereof.

The suspension stabilizer is an additive that functions to stabilize reactants and allow uniform and stable particles to be formed during the polymerization of the vinyl chloride-based polymer, wherein it is not particularly limited, but the suspension stabilizer may be used in an amount of 0.03 part by weight to 5 parts by weight based on 100 parts by weight of the vinyl chloride-based monomer. In a case in which the suspension stabilizer is used in an amount of less than 0.03 part by weight, since a particle size of the finally-prepared vinyl chloride-based polymer is excessively increased, non-gelling particles may occur in a molded article prepared using the vinyl chloride-based polymer, and, in a case in which the suspension stabilizer is used in an amount of greater than 5 parts by weight, initial colorability of the molded article prepared using the vinyl chloride-based polymer may be reduced due to an increase in fine particles in the finally-prepared vinyl chloride-based polymer.

The suspension stabilizer may be one selected from the group consisting of a vinyl alcohol-based resin, cellulose, and an unsaturated organic acid polymer, or a mixture of two thereof, and, specifically, the suspension stabilizer may be a mixture in which the vinyl alcohol-based resin and the cellulose are mixed. In this case, a mixing ratio of the vinyl alcohol-based resin to the cellulose is not particularly limited, but the vinyl alcohol-based resin and the cellulose may be mixed by appropriately adjusting the mixing ratio according to the purpose, and, for example, the vinyl alcohol-based resin and the cellulose are mixed in a weight ratio of 5:1 to 9:7. Also, the vinyl alcohol-based resin may be a mixture in which a first polyvinyl alcohol having a degree of hydration of greater than 50 wt % and equal to or less than 90 wt % and a second polyvinyl alcohol having a degree of hydration of 30 wt % to 50 wt % are mixed. In this case, the first polyvinyl alcohol and the second polyvinyl alcohol are not particularly limited, but, for example, the first polyvinyl alcohol and the second polyvinyl alcohol may be mixed in a weight ratio of 2:1 to 1:2.

Furthermore, the cellulose is not particularly limited, but the cellulose may include methyl cellulose, hydroxyethylcellulose, or hydroxypropylmethylcellulose, and may include any one thereof or a mixture of two or more thereof. Among these, the cellulose may be hydroxypropylmethylcellulose, and may specifically be hydroxypropylmethylcellulose in which an amount of a hydroxypropyl group in the molecule may be in a range of 3 wt % to 20 wt % and viscosity of 2% aqueous solution at 23±5° C. may be in a range of 10 cps to 20,000 cps.

Also, the unsaturated organic acid polymer may include an acrylic acid polymer, a methacrylic acid polymer, an itaconic acid polymer, a fumaric acid polymer, a maleic acid polymer, or a succinic acid polymer, and may include any one thereof or a mixture of two or more thereof.

The polymerization initiator may be used in an amount of 0.02 part by weight to 0.2 part by weight based on 100 parts by weight of the vinyl chloride-based monomer used in the polymerization, but the present invention is not limited thereto. If the amount of the polymerization initiator is less than 0.02 part by weight, since polymerization reaction time may be increased and a conversion rate to the vinyl chloride-based polymer may be decreased, productivity may be reduced. If the amount of the polymerization initiator is greater than 0.2 part by weight, since the polymerization initiator may not be completely consumed during the polymerization but may remain in the finally prepared vinyl chloride-based polymer, physical properties, particularly thermal stability, of the polymer may be reduced.

The polymerization initiator is not particularly limited, but, for example, may include a peroxide-based compound such as dicumyl peroxide, dipentyl peroxide, di-3,5,5-trimethyl hexanoyl peroxide, or dilauryl peroxide; a peroxydicarbonate-based compound such as diisopropyl peroxydicarbonate, di-sec-butyl peroxydicarbonate, or di-2-ethylhexyl peroxydicarbonate; a peroxyester-based compound such as t-butyl peroxypivalate, 1,1,3,3-tetramethylbutyl peroxyneodecanoate, or t-butyl peroxyneodecanoate; an azo-based compound such as azobis-2,4-dimethylvaleronitrile; a hydroperoxide-based compound such as t-butyl hydroperoxide; or a sulfate-based compound such as potassium persulfate or ammonium persulfate, and any one thereof or a mixture of two or more thereof may be used.

As described above, the suspension polymerization may be performed by adjusting a foam level in the polymerization reactor to be maintained at 10% or less. In this case, the foam level may be adjusted by adding a defoamer.

In the present invention, the expression "foam level" represents a degree of occurrence of a foam generated during the polymerization reaction, wherein it may denote a ratio of a thickness of the foam generated on an outermost surface (uppermost portion) of a reactant to a total height from the outermost surface of the reactant to the top of the polymerization reactor. That is, when the total height from the outermost surface of the reactant to the top of the polymerization reactor is set to 100%, the foam level may express the height of the thickness of the foam formed on the outermost surface of the reactant as a percentage. For example, in a case in which the total height from the outermost surface of the reactant to the top of the polymerization reactor is 100 cm and the thickness of the foam formed on the outermost surface of the reactant is 20 cm, the foam level may correspond to 20%. Herein, the reactant may include all additives additionally used according to the purpose in addition to the above-described polymerization initiator, suspension stabilizer, and vinyl chloride-based polymer, and thus, the reactant may represent a liquid-phase mixture of all materials used in the polymerization reaction which are present in the polymerization reactor.

Specifically, the suspension polymerization may be performed by adjusting the foam level by adding a defoamer so that the foam level in the polymerization reactor is maintained at 10% or less. For example, the foam level may be adjusted by adding the defoamer so that the foam level is maintained at 8% or less. Herein, a point where the foam level is 10% may be a point where the thickness of the foam generated on the outermost surface of the reactant corresponds to 10% of the total height (100%) from the outermost surface of the reactant to the top of the polymerization reactor.

Also, the foam level may be measured with a foam detector.

The foam detector is separately provided on the top of the polymerization reactor by being separated from the reflux condenser, a portion of the foam detector may be inserted from the top of the polymerization reactor into the inside thereof, and a lowermost end of the inserted foam detector may be disposed above a defoamer feed line in a height direction of the polymerization reactor. Furthermore, the lowermost end of the foam detector may be in contact with the outermost surface of the reactant or may be disposed under the outermost surface. In a case in which the lowermost end of the foam detector is disposed under the outermost surface of the reactant, the lowermost end of the foam detector may be disposed above the defoamer feed line while the lowermost end of the foam detector is immersed in the reactant.

The foam detector according to an embodiment of the present invention may be a non-contact type foam detector, and any non-contact type foam detector conventionally known in the art may be used as the non-contact type foam detector according to the purpose without particularly limitation, but, for example, a radar sensor may be used.

That is, the suspension polymerization according to an embodiment of the present invention may be performed such that the foam level is maintained at 10% or less by continuously detecting the foam level generated in the polymerization reactor during the polymerization reaction with the foam detector and adding the defoamer when the foam level reaches a predetermined value or more.

The defoamer may be added when the foam level is in a range of 3% or more to 10% or less, and, specifically, may be added when the foam level is in a range of 5% or more to 8% or less. In a case in which the defoamer is added when the foam level is less than 3%, since an amount of fish-eyes occurred in the prepared vinyl chloride-based polymer is reduced, surface properties may be improved, but a degree of improvement in the surface properties may be insignificant in comparison to an increase in amount of the defoamer used, and transparency and haze may be reduced due to the large amount of the defoamer used. In contrast, in a case in which the defoamer is added when the foam level is greater than 10%, since the amount of fish-eyes occurred in the prepared vinyl chloride-based polymer is significantly increased, the surface properties may be deteriorated. The number of additions of the defoamer and a method of adding the defoamer are not particularly limited, but the defoamer may be simultaneously added every time the foam level measured with the foam detector reaches a predetermined value or may be continuously added until the foam level is reduced to less than a predetermined value. Also, the amount of the defoamer added is not particularly limited and the defoamer may be used by appropriately adjusting the amount such that the desired foam level is obtained, but the defoamer may be used in an amount such that the entire amount of the defoamer used is 0.1 part by weight or less based on 100 parts by weight of the vinyl chloride-based monomer. In a case in which the defoamer is used in an amount of greater than 0.1 part by weight based on 100 parts by weight of the vinyl chloride-based monomer, since foam removal and foam generation suppression effects may be increased, it may be effective in reducing the amount of fish-eyes occurred in the prepared vinyl chloride-based polymer, but, since a color of the vinyl chloride-based polymer becomes turbid, the transparency and haze may be reduced.

Also, the defoamer may be added through the defoamer feed line included in the polymerization reactor, and the defoamer feed line may be located at a midpoint of a total height from a bottom of the polymerization reactor to the top thereof.

The expression "bottom" used in the present invention may denote a lowermost portion or a bottom portion of the polymerization reactor, and the expression "top" may denote an uppermost portion or a top portion of the polymerization reactor.

Specifically, the defoamer may be added into the polymerization reactor through the defoamer feed line which is located at the midpoint of the total height from the bottom of the polymerization reactor to the top thereof, and, in this case, the midpoint may be located at 4/7 to 5/7 of the total height from the bottom of the polymerization reactor to the top thereof from the bottom. For example, the defoamer feed line may be located under the outermost surface (uppermost portion) of the reactant in the polymerization reactor while being located at the midpoint of the total height from the bottom of the polymerization reactor to the top thereof. Thus, since the added defoamer may be easily mixed with the reactant in the polymerization reactor, the foam removal and foam generation suppression effects may be improved even by a small amount of the defoamer used.

The defoamer used in the suspension polymerization according to the embodiment of the present invention is not particularly limited and any defoamer conventionally known in the art may be used, but examples of the defoamer may be silicon oils such as polysiloxane, dimethylpolysiloxane, and diphenyl polysiloxane; aliphatic or aromatic alcohols having 10 to 30 carbon atoms; a surfactant such as polyvinyl alcohol having a low saponification degree; and polyoxyalkylene glycols.

The suspension polymerization according to the embodiment of the present invention may be performed in such a manner that conditions, such as a polymerization temperature, are appropriately adjusted according to the purpose without particular limitation except that the foam level in the polymerization reactor is maintained within the above-described range.

For example, the suspension polymerization may be performed in a temperature range of 30° C. to 70° C., and the temperature may be appropriately adjusted within the above range according to a desired degree of polymerization. For example, the higher the desired degree of polymerization is, the lower the temperature may be, and the lower the desired degree of polymerization is, the higher the temperature may be.

Furthermore, in the suspension polymerization, the polymerization may be terminated by adding a reaction terminator, and the termination point may be a point at which a pressure in the reactor is in a range of 6 kg/cm$^2$ to 8 kg/cm$^2$ (or point at which a polymerization conversion rate is greater than 85%).

The reaction terminator is not particularly limited, but, for example, may include a phenolic compound, an amine compound, a nitrile compound, or a sulfur compound. Specifically, the reaction terminator may be at least one selected from the group consisting of a phenolic compound, such as triethylene glycol-bis-3-(3-t-butyl-4-hydroxy-5-methylphenyl)propionate, hydroquinone, p-methoxy phenol, t-butyl hydroxyanisole, n-octadecyl-3-(4-hydroxy-3,5-di-t-butylphenyl)propionate, 2,5-di-t-butylhydroquinone, 4,4'-butylidenebis(3-methyl-6-t-butylphenol), t-butyl catechol, 4,4'-thiobis(6-t-butyl-m-cresol), and tocopherol, an amine compound, such as N,N'-diphenyl-p-phenylenediamine and 4,4'-bis(dimethylbenzyl)diphenylamine, a nitrile compound, such as 2-phenyl nitronyl nitroxide, 3-imidazoline nitroxide, and 4-hydroxy-2,2',6,6'-tetramethyl-piperidine-1-oxyl, and a sulfur compound such as dodecyl mercaptan and 1,2-diphenyl-2-thiol.

Also, a solvent may be used in the suspension polymerization, and the solvent may be deionized water. In this case, an amount of the solvent used may be appropriately adjusted according to a size of the polymerization reactor and an amount of the vinyl chloride-based monomer used in the polymerization, and, for example, the solvent may be used in an amount of 70 parts by weight or more based on 100 parts by weight of the vinyl chloride-based monomer.

In addition, in the suspension polymerization, an additive, such as a polymerization regulator, a chain transfer agent, a pH adjuster, an antioxidant, a cross-linking agent, an antistatic agent, a scale inhibitor, and a surfactant, may be further added as needed in addition to the above-described active ingredients, and type and amount of the additive are not particularly limited and the type and amount known in the art may be used. The additive may be added at any point, for example, at the beginning of the suspension polymerization, in the middle of the polymerization, or after the polymerization, and may be added simultaneously or continuously.

The preparation method according to the present invention may further include drying after the step A, and the drying is not particularly limited and may be performed by a method known in the art.

Also, the present invention provides a vinyl chloride-based polymer prepared by the above-described preparation method.

Since the vinyl chloride-based polymer according to an embodiment of the present invention is prepared by the above-described preparation method, the vinyl chloride-based polymer may have excellent transparency. Specifically, the vinyl chloride-based polymer may have a transparency of 84 to 85 and a haze of 6.5 to 7.0.

Furthermore, the vinyl chloride-based polymer may have excellent surface properties, and, specifically, the amount of fish-eyes occurred in the vinyl chloride-based polymer may be 10 or less, for example, 5 or less.

Herein, after 3 parts by weight of a tin-based stabilizer and 0.3 part by weight of a lubricant are added to 100 parts by weight of the vinyl chloride-based polymer and the mixture is kneaded for 4 minutes with a roll-mill at 160° C. to prepare a 0.05 mm thick sheet, the transparency and the haze are values measured by using a Haze-gard plus instrument (BYK-Gardener), and the materials other than the vinyl chloride-based polymer are additives added to facilitate the preparation of the sheet, wherein the transparency and haze are expressed from the vinyl chloride-based polymer.

Also, after 45 parts by weight of dioctyl phthalate, 0.1 part by weight of barium stearate, 0.2 part by weight of a tin-based stabilizer, and 0.1 part by weight of carbon black are added to 100 parts by weight of the vinyl chloride-based polymer and the mixture is mixed and kneaded for 6 minutes using 6 inch rolls at 140° C. to prepare a 0.3 mm thick sheet, the amount of fish-eyes occurred is measured by measuring the number of white transparent particles in an area of 100 cm$^2$.

In addition, the present invention provides an apparatus for preparing a vinyl chloride-based polymer which may prepare the vinyl chloride-based polymer.

The apparatus for preparing a vinyl chloride-based polymer according to an embodiment of the present invention includes a polymerization reactor; a reflux condenser provided on a top of the polymerization reactor; a foam detector separately provided on the top of the polymerization reactor by being separated from the reflux condenser; and a defoamer feed line disposed at a midpoint of the polymerization reactor in a height direction.

The apparatus for preparing a vinyl chloride-based polymer may be used to perform the above-described method of preparing a vinyl chloride-based polymer.

Hereinafter, the apparatus for preparing a vinyl chloride-based polymer according to the embodiment of the present invention will be described with reference to the figure.

the figure schematically illustrates the apparatus for preparing a vinyl chloride-based polymer according to the embodiment of the present invention.

As illustrated in the figure, an apparatus for preparing a vinyl chloride-based polymer 100 may include a polymerization reactor 10; a reflux condenser 20; a foam detector 30; and a defoamer feed line 40. The reflux condenser 20 and the foam detector 30 may be provided on a top of the polymerization reactor 10 by being separated from each other, and the defoamer feed line 40 may be disposed at a midpoint of the polymerization reactor 10 in a height direction. Herein, a stirrer 50 may be installed in the polymerization reactor 10.

The defoamer feed line 40 is for introducing a defoamer from a defoamer storage tank T provided separately from the polymerization reactor 10 into the polymerization reactor 10, wherein it may be located at 4/7 to 5/7 of the total height in the height direction of the polymerization reactor 10, and may be specifically located at a point lower than an outermost surface S of a reactant in the polymerization reactor 10.

Also, the foam detector 30 is for detecting a foam level in the polymerization reactor 10, wherein a portion thereof may be inserted from the top of the polymerization reactor 10 into the inside thereof, and a lowermost end of the inserted foam detector 30 may be disposed above the defoamer feed line 40 in the height direction of the polymerization reactor 10. Specifically, the lowermost end of the foam detector 30 may be in contact with the outermost surface S of the reactant in the polymerization reactor 10 or may be disposed under the outermost surface. That is, the lowermost end of the foam detector 30 may be in contact with the outermost surface S of the reactant in the polymerization reactor 10 or may be disposed above the defoamer feed line 40 while being immersed in the reactant.

Hereinafter, the present invention will be described in more detail, according to specific examples and experimental examples. However, the following examples and experimental examples are merely presented to exemplify the present invention, and the scope of the present invention is not limited thereto.

EXAMPLE 1

A vinyl chloride polymer was prepared by using the preparation apparatus 100 illustrated in the figure.

Specifically, 390 kg of deionized water, 150 g of polyvinyl alcohol having a degree of hydration of 78.5%, 100 g of polyvinyl alcohol having a degree of hydration of 40.7%, and 30 g of hydroxypropyl methylcellulose were simultaneously added to the polymerization reactor 10 equipped with the reflux condenser 20, and 300 kg of a vinyl chloride monomer was added thereto. Then, 30 g of di-2-ethylhexyl peroxydicarbonate and 120 g of t-butyl peroxyneodecanoate were added to perform a suspension polymerization reaction while the temperature was maintained at 57° C., and, when a foam level detected by the foam detector 30 reached 5%, a LDC-120A defoamer (Dow Corning Co.) was added through the defoamer feed line 40 to continue the polymerization. In this case, the defoamer was added in an amount corresponding to 0.01 part by weight based on 100 parts by weight of the vinyl chloride monomer every time the foam level reached 5% to allow the foam level to be maintained at 5% or less throughout the polymerization reaction. When an internal pressure of the polymerization reactor 10 reached 6.3 kg/cm$^2$, 15 g of 4-hydroxy-2,2,6,6-tetramethyl-piperidine-1-oxyl and g of triethylene glycol-bis-3-(3-t-butyl-4-hydroxy-5-methylphenyl)propionate were added to the polymerization reactor 10 to terminate the reaction, and the unreacted monomer and a polymer slurry were separated and recovered from the polymerization reactor 10. The recovered polymer slurry was dried in a fluidized bed dryer to obtain a vinyl chloride polymer.

EXAMPLE 2

A vinyl chloride polymer was prepared in the same manner as in Example 1 except that the defoamer was added in an amount corresponding to 0.01 part by weight based on 100 parts by weight of the vinyl chloride monomer every time the foam level detected by the foam detector reached 3%.

EXAMPLE 3

A vinyl chloride polymer was prepared in the same manner as in Example 1 except that the defoamer was added in an amount corresponding to 0.01 part by weight based on 100 parts by weight of the vinyl chloride monomer every time the foam level detected by the foam detector reached 10%.

COMPARATIVE EXAMPLE 1

A vinyl chloride polymer was prepared by suspension polymerization using a preparation apparatus without a defoamer feed line.

Specifically, 390 kg of deionized water, 150 g of polyvinyl alcohol having a degree of hydration of 78.5%, 100 g of polyvinyl alcohol having a degree of hydration of 40.7%, and 30 g of hydroxypropyl methylcellulose were simultaneously added to a polymerization reactor having an internal volume of 1 m$^3$ and equipped with a reflux condenser, and 300 kg of a vinyl chloride monomer was added thereto. Then, 30 g of di-2-ethylhexyl peroxydicarbonate and 120 g of t-butyl peroxyneodecanoate were added to perform a suspension polymerization reaction while the temperature was maintained at 57° C. When an internal pressure of the polymerization reactor reached 6.3 kg/cm$^2$, 15 g of 4-hydroxy-2,2,6,6-tetramethyl-piperidine-1-oxyl and 60 g of triethylene glycol-bis-3-(3-t-butyl-4-hydroxy-5-methylphenyl)propionate were added to the polymerization reactor to terminate the reaction, and the unreacted monomer and a polymer slurry were separated and recovered from the polymerization reactor. The recovered polymer slurry was dried in a fluidized bed dryer to obtain a vinyl chloride polymer.

COMPARATIVE EXAMPLE 2

A vinyl chloride polymer was prepared in the same manner as in Example 1 except that the defoamer was added with the polymerization initiator before the initiation of the polymerization. In this case, the defoamer was used in the same amount as that in Example 1.

Comparative Example 3

A vinyl chloride polymer was prepared in the same manner as in Example 2 except that the defoamer was continuously added simultaneously with the operation of the reflux condenser. Herein, the starting point of the operation of the reflux condenser may be a time when the foam had started to occur and may be a time when the foam level was about 1%. In this case, 0.01 part by weight of the defoamer was continuously added for five minutes at a five minute interval.

COMPARATIVE EXAMPLE 4

A vinyl chloride polymer was prepared in the same manner as in Example 3 except that the defoamer was added in an amount corresponding to 0.01 part by weight based on 100 parts by weight of the vinyl chloride monomer every time the foam level detected by the foam detector reached 15%. In this case, the defoamer was used in the same amount as that in Example 3.

COMPARATIVE EXAMPLE 5

A vinyl chloride polymer was prepared in the same manner as in Example 3 except that the defoamer was added in an amount corresponding to 0.01 part by weight based on 100 parts by weight of the vinyl chloride monomer every time the foam level detected by the foam detector reached 30%.

COMPARATIVE EXAMPLE 6

A vinyl chloride polymer was prepared in the same manner as in Example 3 except that the defoamer was added in an amount corresponding to 0.01 part by weight based on 100 parts by weight of the vinyl chloride monomer every time the foam level detected by the foam detector reached 70%.

COMPARATIVE EXAMPLE 7

A vinyl chloride polymer was prepared in the same manner as in Example 3 except that the defoamer was added in an amount corresponding to 0.02 part by weight based on 100 parts by weight of the vinyl chloride monomer every time the foam level detected by the foam detector reached 30%.

COMPARATIVE EXAMPLE 8

A vinyl chloride polymer was prepared in the same manner as in Example 1 except that the defoamer was added through the top of the polymerization reactor 10. In this case, the defoamer was used in the same amount as the defoamer used in Example 1.

EXPERIMENTAL EXAMPLE 1

In order to comparatively analyze surface properties of each vinyl chloride polymer prepared in Examples 1 to 3 and Comparative Examples 1 to 8, an average particle diameter, an amount of fish-eyes occurred, transparency, and haze were measured. The results thereof are presented in Table 1 below.

(1) Average Particle Diameter

In order to check the average particle diameter of each vinyl chloride polymer, the average particle diameter was measured according to ASTM D1705.

(2) Amount of Fish-eyes Occurred

After 45 parts by weight of dioctyl phthalate (DOP), 0.1 part by weight of barium stearate, 0.2 part by weight of a tin-based stabilizer (MT800, SONGWON Industrial Co., Ltd.), and 0.1 part by weight of carbon black were added to 100 parts by weight of each vinyl chloride polymer and the mixture was mixed and kneaded for 6 minutes using 6 inch rolls at 140° C., each sheet having a thickness of 0.3 mm was prepared. The number of white transparent particles in an area of 100 $cm^2$ in each sheet was measured.

(3) Transparency and Haze

After 3 parts by weight of a tin-based stabilizer (MT800, SONGWON Industrial Co., Ltd.) and 0.3 part by weight of a lubricant (SL63, LG Chem) were added to 100 parts by weight of each vinyl chloride polymer and the mixture was kneaded for 4 minutes with a roll-mill at 160° C. to prepare each sheet having a thickness of 0.05 mm. Transparency and haze of each sheet were measured by using a Haze-gard plus instrument (BYK-Gardener). The higher the value was, the better the transparency was, and the lower the value was, the better the haze was.

TABLE 1

| Category | Total amount of defoamer used (part by weight) | Maximum foam level during polymerization (%) | Average particle diameter (μm) | Amount of fish-eyes occurred (numbers) | Transparency | Haze |
| --- | --- | --- | --- | --- | --- | --- |
| Example 1 | 0.05 | 5 | 135 | 5 | 84.5 | 6.87 |
| Example 2 | 0.09 | 3 | 133 | 4 | 84.6 | 6.79 |
| Example 3 | 0.03 | 10 | 135 | 5 | 84.5 | 6.8 |
| Comparative Example 1 | — | 89 | 135 | 59 | 85.1 | 6.63 |
| Comparative Example 2 | 0.05 | 36 | 154 | 23 | 84.5 | 7.02 |

TABLE 1-continued

| Category | Total amount of defoamer used (part by weight) | Maximum foam level during polymerization (%) | Average particle diameter (μm) | Amount of fish-eyes occurred (numbers) | Transparency | Haze |
|---|---|---|---|---|---|---|
| Comparative Example 3 | 0.4 | 1 | 137 | 7 | 81.4 | 10.20 |
| Comparative Example 4 | 0.03 | 15 | 138 | 10 | 82.7 | 9.2 |
| Comparative Example 5 | 0.01 | 30 | 131 | 11 | 84.8 | 6.58 |
| Comparative Example 6 | 0.01 | 70 | 135 | 18 | 84.7 | 6.71 |
| Comparative Example 7 | 0.04 | 30 | 135 | 12 | 82.5 | 9.27 |
| Comparative Example 8 | 0.05 | 19 | 133 | 14 | 83.2 | 8.39 |

As illustrated in Table 1, it was confirmed that each of the vinyl chloride polymers of Examples 1 to 3 according to the present invention had a significantly decreased amount of fish-eyes occurred while having overall better transparency and haze in comparison to the vinyl chloride polymers of Comparative Examples 1 to 8.

Specifically, while the transparency and haze values of the vinyl chloride polymers of Examples 1 to 3 according to the present invention, which were prepared while maintaining the foam level, were at equivalent levels to those of the vinyl chloride polymer of Comparative Example 1 (no addition of the defoamer) which was prepared without the adjustment of the foam level, the amounts of fish-eyes occurred were rapidly reduced to a level of $\frac{1}{12}$ to $\frac{1}{15}$. Also, with respect to the vinyl chloride polymer of Comparative Example 2 which was prepared by not adding the defoamer to maintain the foam level at a predetermined level, but adding the defoamer with the reactant to the polymerization reactor before the initiation of the polymerization, the transparency and haze were similar to those of the vinyl chloride polymer of Example 1 despite using the same amount of the defoamer, but the amount of fish-eyes occurred was significantly increased by about 5.7 times.

Also, with respect to the vinyl chloride polymer of Comparative Example 3 which was prepared while maintaining the foam level at less than the predetermined level proposed in the present invention, the transparency and haze were reduced and the amount of fish-eyes occurred was increased by 1.75 times despite using the defoamer in an amount 4 times or more of the vinyl chloride polymer of Example 2. With respect to the vinyl chloride polymer of Comparative Example which was prepared while maintaining the foam level at greater than the predetermined level, the transparency and haze were reduced and the amount of fish-eyes occurred was significantly increased by about two times despite using the same amount of the defoamer as the vinyl chloride polymer of Example 3.

In addition, with respect to the vinyl chloride polymer of Comparative Example 8 which was prepared by not adding the defoamer at the midpoint of the polymerization reactor as proposed in the present invention, but adding the defoamer through the top of the polymerization reactor, the transparency and haze were reduced and the amount of fish-eyes occurred was increased by about 3 times despite using the same amount of the defoamer as the vinyl chloride polymer of Example 1.

The invention claimed is:

1. A method of preparing a vinyl chloride-based polymer, the method comprising introducing a reactant including a polymerization initiator, a suspension stabilizer, and a vinyl chloride-based monomer into a polymerization reactor equipped with a reflux condenser on a top thereof and performing suspension polymerization,
   wherein the suspension polymerization is performed by adjusting a foam level in the polymerization reactor to be maintained at 10% or less,
   the foam level represents a ratio of a thickness of a foam generated on an outermost surface of the reactant to a total height from the outermost surface of the reactant in the polymerization reactor to the top of the polymerization reactor, and
   the foam level is adjusted by adding a defoamer,
   wherein the defoamer is added when the foam level is in a range of 3% or more to 10% or less.

2. The method of claim 1, wherein the defoamer is added through a defoamer feed line included in the polymerization reactor, and
   the defoamer feed line is located at a midpoint of the polymerization reactor in a height direction.

3. The method of claim 2, wherein the defoamer feed line is located at $\frac{4}{7}$ to $\frac{5}{7}$ of a total height from a bottom of the polymerization reactor to the top thereof, from the bottom.

4. The method of claim 1, wherein the foam level is measured with a foam detector,
   wherein the foam detector is separately provided on the top of the polymerization reactor by being separated from the reflux condenser, and a portion of the foam detector is inserted from the top of the polymerization reactor into an inside thereof.

5. An apparatus for preparing a vinyl chloride-based polymer, the apparatus comprising:
   a polymerization reactor;
   a reflux condenser provided on a top of the polymerization reactor;
   a foam detector separately provided on the top of the polymerization reactor by being separated from the reflux condenser; and
   a defoamer feed line disposed at a midpoint of the polymerization reactor in a height direction.

6. The apparatus for preparing a vinyl chloride-based polymer of claim 5, wherein the defoamer feed line is located at $\frac{4}{7}$ to $\frac{5}{7}$ of a total height from a bottom of the polymerization reactor to the top thereof, from the bottom.

7. The apparatus for preparing a vinyl chloride-based polymer of claim 5, wherein a portion of the foam detector is inserted from the top of the polymerization reactor into an inside thereof, and a lowermost end of the foam detector inserted into the inside is disposed above a position where the defoamer feed line is located.

\* \* \* \* \*